Patented May 29, 1923.

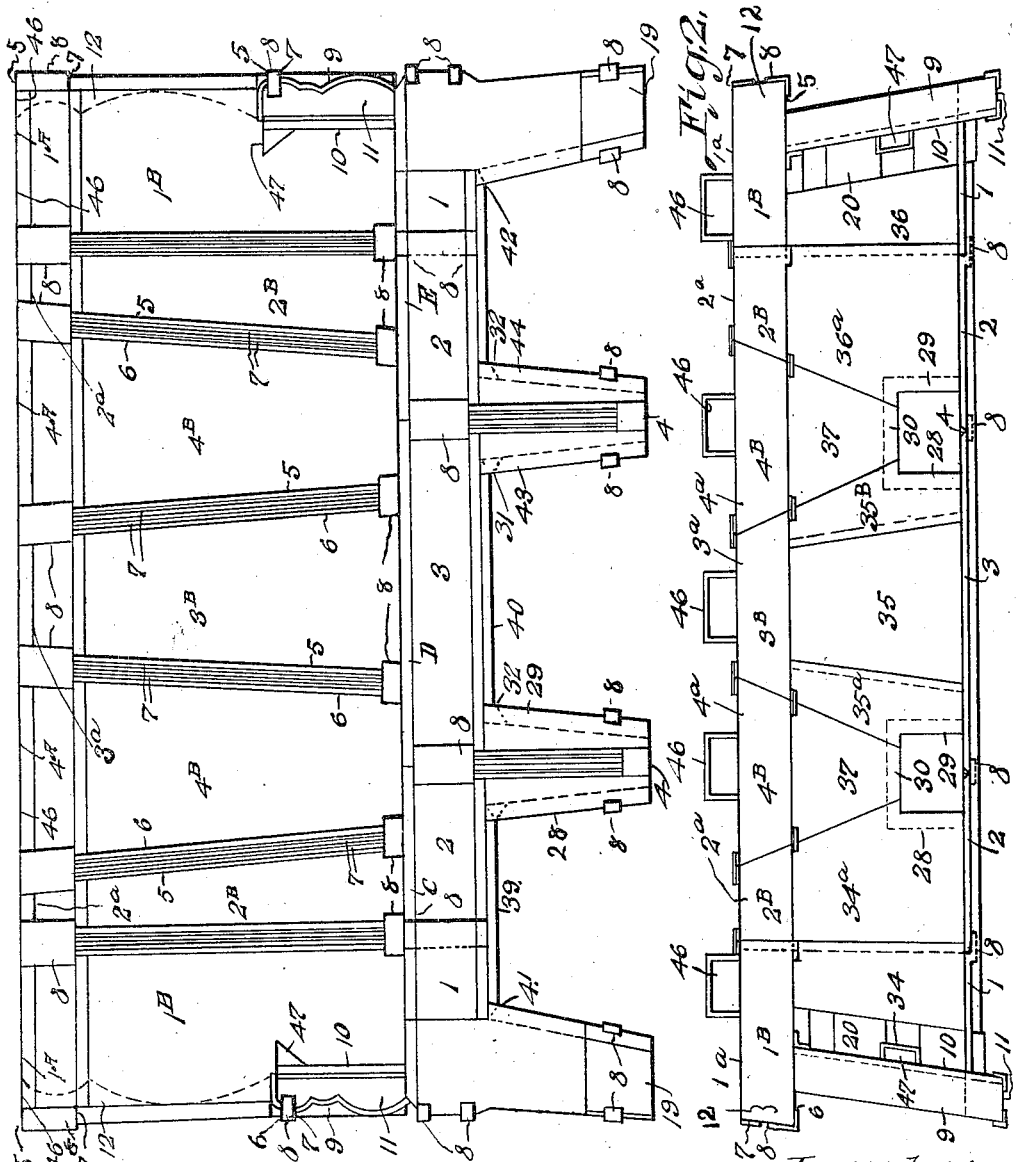

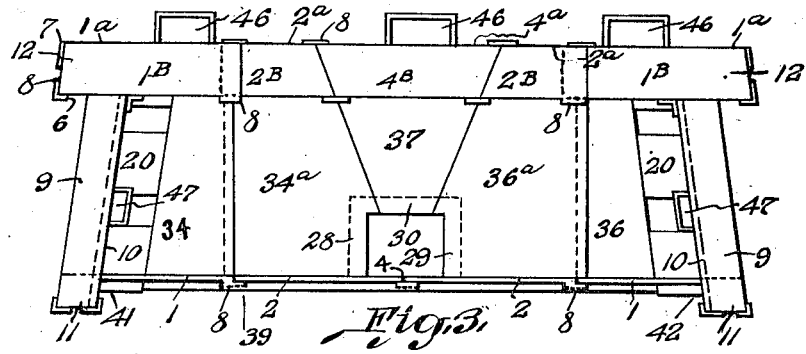

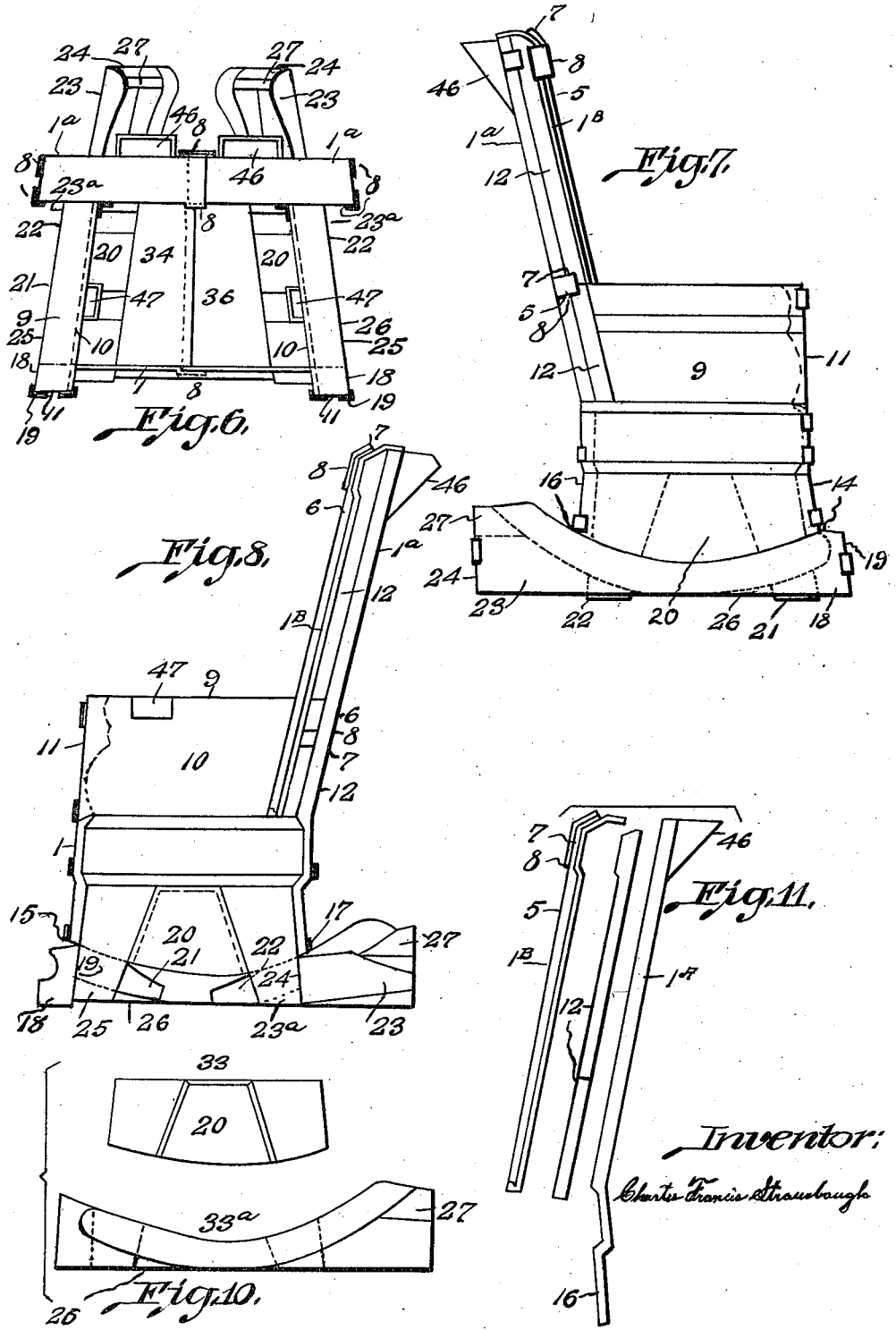

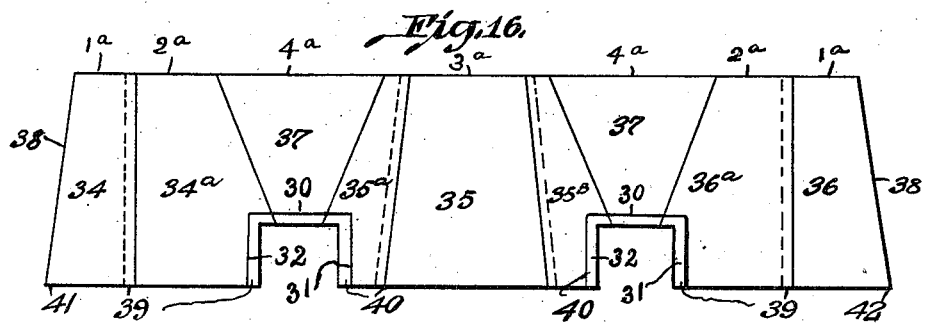
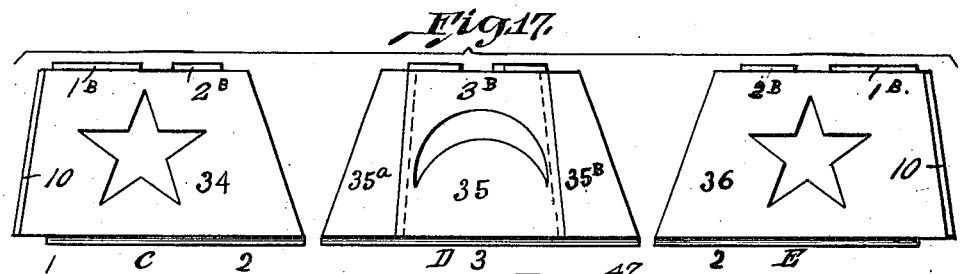
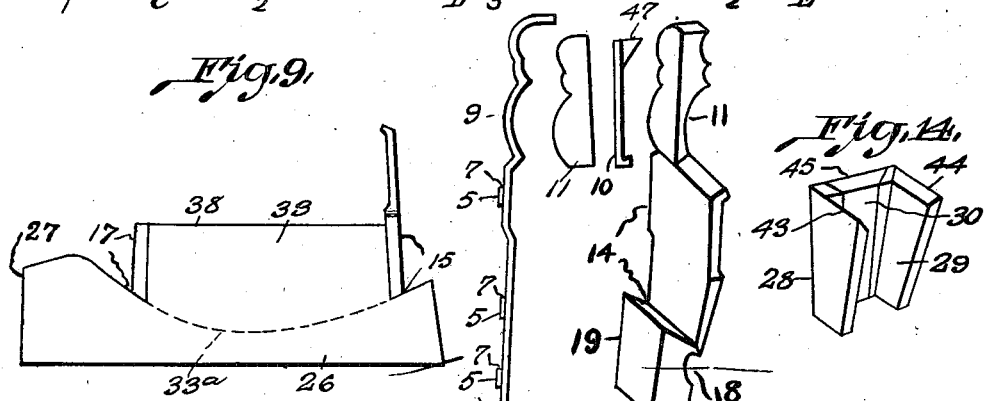
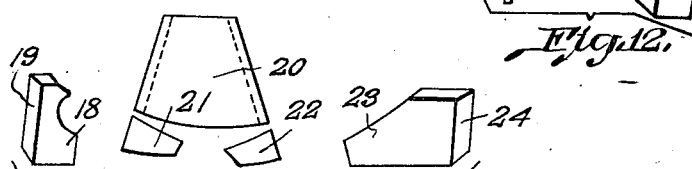
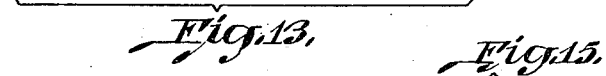
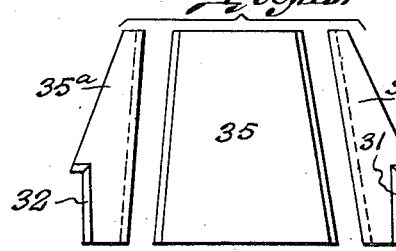

1,456,947

UNITED STATES PATENT OFFICE.

CHARLES FRANCIS STRAUSBAUGH, OF DETROIT, MICHIGAN.

MOLD FORMS IN PAIRS OF COMBINATIVE ASSEMBLED FORMS FOR THE MAKING OF ARTIFICIAL-STONE FURNITURE, ETC.

Application filed August 16, 1920. Serial No. 404,042.

*To all whom it may concern:*

Be it known that I, CHARLES FRANCIS STRAUSBAUGH, a citizen of the United States, residing at Detroit, in the county of Wayne and the State of Michigan, have invented certain new and useful Improvements in Mold Forms in Pairs of Combinative Assembled Forms for the Making of Artificial-Stone Furniture, of which the following is a specification, reference being had therein to the accompanying drawings.

This invention relates to changeable and interchangeable sectional molds comprising ends, seat, legs and back sections and parts, having right angle and bevel angular inward and outward right and left detachable abutting engagements, for the purpose of making a variety of cementitious stone or earthenware rockers, angular seats, polygonal or like curve benches of different sizes and shape for interior and exterior private or public rooms on verandas, porches, etc., on lawns in parks, or any place that it may be desired to place the same.

They may be formed from cementitious or plastic material to closely simulate the design proposed.

It is one of my primary objects to provide a mold having interchangeable and supplemental sections of novel and cheap construction made of wood or metal, simple in design, inexpensive to characterize an artistic embodiment and receive the cementitious or earthen material within the forms, retainable until solidified, detachable from the molded product, easily assembled to procure the proper molds.

A further object of this invention is to provide bars having dovetail taper grooves, and a corresponding dovetail taper tongue which may be formed with straight or bevel edge right and left angular ends which may be cut in single parts for connections, and in double for straight or angular tie plates or may be bent to proper form for engagements throughout the mold.

Further features and novel details in the construction and arrangements of the various parts will be appreciated from the description to follow which for a clear understanding of the invention is to be considered in connection with the elements of the accompanying drawings, which form a part hereof, it being borne in mind in this connection that I contemplate various changes in structural details and arrangements of parts all of which is within the spirit of the invention pointed out in the claims specification and the drawings of which—

Fig. 1 is a front elevation of the molds, the parts being assembled to illustrate the formation of the back, arms, seat, ends, legs, and intermediate seat and leg parts thereof.

Fig. 2 is a plan of the same being assembled to illustrate the formation with right and left bevel and overlying back and ends.

Fig. 3 is a plan of the same to illustrate a right interchangeable formation of the mold parts.

Fig. 4 is a plan being assembled to illustrate a right and left end interchangeable formation of the mold parts with respect to the central part.

Fig. 5 is a plan of assembled ends to illustrate the formation of the mold with changeable and interchangeable ends thereof.

Fig. 6 is a plan of the same changeable ends to form a rocking chair.

Fig. 7 is an end elevation of the molds in position to illustrate the formation of the rocker ends thereof.

Fig. 8 is a similar view with the ends to form a bench having interchangeability as to the legs.

Fig. 9 is an end view of the inner seat and leg parts of Fig. 7.

Fig. 10 is an end view of the inner rocker base and leg support in position with spacing parts thereof.

Figs. 11, 12 and 13 are views of disassembled sections, parts and supplemental sections.

Fig. 14 is a view of intermediate front leg parts to illustrate the angular elements.

Fig. 15 is a view of an under bottom seat mold, part for Figs. 6 and 7 formations.

Fig. 16 is a perspective, of under bottom connections for Fig. 1 and for Fig. 2.

Fig. 17 shows some modifications of design.

With more particular reference to the drawings wherein like reference numerals and letters refer to corresponding parts throughout the several views;

The mold is made up of standard sections as 3B which designates a part of the back mold which is narrower at the top than at the bottom and supplemental sections 4B which are narrower at the bottom than at the top. Thus by setting up the proper number of sections 3 B and inserting between them the sections 4B, a back for a bench of any length may be formed. The ends are shown more particularly in Figs. 1, 7 and 8 designated by reference characters 9, 10, 11 and 12.

In making my mold there are provided outer ends of sheet metal or metallic plates 9, of construction shaped and formed to suitable outlines, also bar parts 5 and 6 provided with lug projections and dovetail taper grooves 7 or dovetail taper tongues 8 fixedly attached to their outer edges. Also an inner rocker and base mold part 33.A shown in Fig. 10 and under rocker and base edge spacing parts 26 and 27, detachably secured in position in any desirable manner as by screws and metallic bar parts 5 and 6 with lug projecting parts 16 and 17, also dovetail taper grooves 7 and dovetail taper tongues 8, and corresponding tie plates detachably placed upon a sheet metal flange ledge of plate 9. Also right and left reversible and interchangeable rocker tip and base edge members 18 and 19, and leg mold 25. Likewise interchangeable and intermediate under rocker and base edge members 23 and 24, and leg mold 23 A, which forms a concave base; also a detachable interchangeable under rocker and leg edge member 21 which when in position, rests upon part 26 to form a leg part as at 25, also a changeable under rocker and leg edge member 22 in position as at 23 A. may be changed to form a leg part connected to a concave edge and under edge design. Referring to Fig. 17, there are shown means to receive the colored cementitious plastic or earthen material in ornamented designs.

A right and left separable convex leg with angular taper rocker seat end supporting part 33 rests upon part 33 A, and lugs 15 and 17 and bar parts 5 and 6 with dovetail taper grooves 7, or dovetail taper tongues 8 to receive a corresponding tie plate overlying the joints. Referring to Figs. 1, 8 and 9 at 8, 39, 41 and 42 parts 1, is adapted to seat parts 35, placed upon part 33. Referring to Figs. 10 and 15 to 17, there are provided separable angular leg spacing convex core members 20 and 20.A which are placed with the plates 9 and with end support 33, to mold end legs. By separating part 20, I may have convex angular edge inlet end support, referring to Figs. 7, 8 and 10.

Means are provided to receive the cement plastic or earthen material in color outlines adhering to the ground color.

The parts of the mold which characterize the back members A and B may have bars adapted for tie plates shaped of thin metal pressed to any desirable angle of the parts 5 and 6 and with the dovetail taper grooves 7 or dovetail taper tongues 8.

The members A may be wood shaped to form right and left flat and bevel angular edges to abut against opposite ends and with tapered edges right and left to form a U shaped flat edge opening adjacent which are placed metallic members 46 to receive the cementitious or earthen material.

Members A and B are provided with detachable end edge changeable spacing members 12 with ends adapted to either right and left angular position as 12 or 12.A. Members B of sheet metal are shaped to overlie said member. The lower end is formed with a gutter ledge in horizontal alignment with the seat having a marginal flange to provide engaging ends and arm rests for the seat. The sections of the wooden back members A at a point in horizontal alignment with the under edge of the seat conveniently project inwardly to assist in the assembling of the bottom molds and bar parts 5 and 6 dovetail taper grooves 7 or dovetail taper tongues 8 and are secured to the molds as by screws. So also the embodiment of the invention illustrated in Figs. 1 and 2 is made up in sections. The ends and outer sections 1. A and B, are changeable and adapted for wall connection. Likewise intermediate sections 2. A and B with a central section 3.A and B. are changeable to a right intermediate section 4.A and to interchangeably about 2. A and B. Likewise there is a left intermediate section 4.A interchangeable to abut right section 2.A and B. Referring to Fig. 1.

That portion of the mold for receiving the material to form the seat is made in sections, parts of which cooperate with front plates 1, 2 and 3, comprising end bottom sections 34 and 36 connected to front plates 1 and a special design of seat mold 35 of metal having grooves adapted to rest upon the gutter ledge 1. B. and seat edge part 1 of sheet metal and having bar parts 5 and 6 connected to inner seat edge and end connections as at 39 referring to Fig. 4.

Means are provided to receive the cementitious and plastic or earthen material to form colored designs on the central and intermediate arms 34A and 36.A, the front ends are cut away on the right and left, and have depending bevel edge flanges 31 and 32 adapted to rest upon the upper end of leg parts 28 and 29 and 43 and 44 respectively. Conveniently depending front plates 2 have right and left leg extensions bent to desired form and are fixedly attached to inner seat and legs and to outer connection bars 5 and 6 by dovetail taper grooves 7 or dovetail taper tongues 8 and corresponding angular tie plates 4 referring to Fig. 5.

Means to receive the cementitious or earthen material to form a color leg intermediate extension to the colored design of the seat requires substituting part 37 having a right triangle cut off at front end and depending bevel edge flange 30 adapted to engage leg part 45 thereof referring to Figs. 7 and 14.

In order to receive the cementitious or earthen material to form a triangle design in the seat in different colors the operator may disengage part 36.A from 37 with the associated back and intermediate leg engagement then connect to one another 35.A. 35 and 35.B cut away at front ends in opposite direction right and left and having bevel edge flanges 31 and 32, adapted to rest upon the upper ends of leg parts 28 and 29 and 43 and 44 respectively. Conveniently depending front plates 3 of sheet metal having opposite right and left leg extension bent to desired form are fixedly attached to inner seat edge and leg edges and to outer connection bars 5 and 6, dovetail taper, grooves 7 or dovetail taper tongues 8 and corresponding tie plates straight as at 8 and angular as at 4 for engagements thereof referring to Figs. 1 and 4.

In order to receive the cementitious or earthen material to form a bench having a left angular end or a right angular end through interchange of said ends, the operator may disassemble the left end as at 35.B and 36.A then assemble part 37a triangle mold cut off at front end having depending bevel edge flange 30 adapted for interchange with leg part 45 thereof referring to Figs. 2 and 14.

In order to receive the cementitious or earthen material to form a left triangle design to the seat and in a desired color design the operator may disassemble parts 37 also right and left associated back sections 4.A and 4.B, then reassemble to abut against ends 34.A and 36.A. likewise 2.A and 2.B, and front plates 2 and 3, and rear sections 3.A and 3B, thereof referring to Fig. 4.

In order to receive the cementitious or earthen material to form central right and left design or central intermediate plain or ornamental, and likewise a back and arm rest there are provided inner arm mold parts 10 cut off at rear end for engagement with sections 1.B opening to gutter ledge B, and seat edge 1. and also there is provided a U-shape opening similar to members A having metallic pockets 47 projecting outward from each of said ends, and there may be introduced a detachable reversible right and left changeable spacing member 11 secured to wooden sections and part as by removable screws referring to Figs. 7, 8 and 12.

From a reference to Figs. 1, 8 and 11 it will be observed that the back and arm members B and 10 terminate at their lower end at a point above the lower end of back members A and 1, a distance substantially equal to the desirable thickness to be given to the seat portion of the molded article.

The wooden bottom sections are placed upon bars arranged transversely to the front plates 1. 2, 3. C and E and D. and are secured in any desirable manner whereby they may be readily detached, conveniently overlying the respective associated parts in interlocking engagement. The plates 1, 2 and 3 constitute an abutment for the material at the front of model bench molds, determining the width of the seat portion as well as the leg portion of the bench.

Because of the right and left bevel angular parts of the mold and the removability, when the cementitious or earthen material has become set the mold sections and parts may be readily detached and the formed product will present a pleasing appearance closely resembling the art of articulating formations of imitation stone earthenware, furniture repair parts or a finished bench.

I claim:

1. In a cementitious or plastic interchangeable furniture mold, the combination of changeable back sections formed in four parts, spaced from one another by interchangeable supplemental members and adapted means to receive the material for forming the back to the seat the foremost of said parts terminating at a right angle above the lower edge of the rearmost members, and members forming a space facing having supplemental members to the seat to receive the material for the ends and having intermediate members, projecting downwardly from the bottom sections parts for forming an intermediate changeable leg, and detachable front plates forming a closure for said ends and permitting an intermediate changeable leg section on the mold.

2. In a cementitious or plastic interchangeable furniture mold, the combination of changeable back section formed in five parts, spaced from one another by spacing means changeable in position, of the ends to receive the material forming end edges to back, the foremost of said parts terminating at a point above the lower edge of the rearmost members and members forming a spacing means changeable to position at the ends for receiving the material for the ends and the seat, intermediate parts, and members projecting downwardly from the bottom sections for forming intermediate changeable legs and detachable front plates forming a closure for the ends and permitting intermediate changeable and interchangeable leg sections on the mold.

3. In a cement furniture mold, the combination of interchangeable back sections formed in seven parts said means comprising rear back sections and front back sections, the front back section terminating above the lower edge of said rear back sections and means for forming the seat and ends the bottom sections being connected to the rear back sections and front plate at a point spaced below the lower edge of the front back sections, and means for forming the end sections, in combination with supplemental members detachable and transferable in position to form rockers, and transferable to position to form a combination of ends, means detachably engaging the bottom sections forming a receiving space to form interchangeable sections and detachable interchangeable end plates which form a closure for the ends and permitting interchangeable section parts on the mold.

4. In a quadrel cementitious or plastic interchangeable furniture wall connection molds the combination of vertical right angle ends changeable with interchangeable and angularly disposed end sections and backs to the sections being hollow and means to the seat and ends to receive therebetween cementitious plastic or the like material, the seat end being adapted to receive a changeable end and interchangeable to angular right and left ends the back being detachably connected together.

CHARLES FRANCIS STRAUSBAUGH.